United States Patent
Yasuda

(10) Patent No.: US 8,104,323 B2
(45) Date of Patent: Jan. 31, 2012

(54) FLOW CONTROLLER, FLOW MEASURING DEVICE TESTING METHOD, FLOW CONTROLLER TESTING SYSTEM, AND SEMICONDUCTOR MANUFACTURING APPARATUS

(75) Inventor: Tadahiro Yasuda, Kobe (JP)

(73) Assignee: Horiba Stec, Co., Ltd., Kyoto-shi (JP)

( * ) Notice: Subject to any disclaimer, the term of this patent is extended or adjusted under 35 U.S.C. 154(b) by 371 days.

(21) Appl. No.: 12/517,796

(22) PCT Filed: Dec. 5, 2007

(86) PCT No.: PCT/JP2007/073457
§ 371 (c)(1),
(2), (4) Date: Jun. 4, 2009

(87) PCT Pub. No.: WO2008/069227
PCT Pub. Date: Jun. 12, 2008

(65) Prior Publication Data
US 2010/0145633 A1  Jun. 10, 2010

(30) Foreign Application Priority Data
Dec. 5, 2006  (JP) .................................. 2006-328876

(51) Int. Cl.
*G01P 21/00* (2006.01)
(52) U.S. Cl. ....................................................... 73/1.35
(58) Field of Classification Search .................. 73/1.35, 73/1.34, 861.05; 137/1
See application file for complete search history.

(56) References Cited

U.S. PATENT DOCUMENTS

| | | | |
|---|---|---|---|
| 5,233,861 A * | 8/1993 | Gore et al. | 73/1.16 |
| 5,394,755 A * | 3/1995 | Sudo et al. | 73/861 |
| 5,744,695 A * | 4/1998 | Forbes | 73/1.35 |
| 6,619,112 B2 * | 9/2003 | Juhasz | 73/168 |
| 7,380,564 B2 * | 6/2008 | Lull et al. | 137/1 |
| 7,424,895 B2 * | 9/2008 | Tison et al. | 137/12 |
| 2009/0183549 A1 * | 7/2009 | Monkowski et al. | 73/1.35 |

FOREIGN PATENT DOCUMENTS

| | | |
|---|---|---|
| JP | 05-215593 | 8/1993 |
| JP | 05-296815 | 11/1993 |
| JP | 06-053103 | 2/1994 |
| JP | 2000-035821 | 2/2000 |

OTHER PUBLICATIONS

ISA/Japanese Patent Office, International Search Report of PCT/JP2007/073457, Feb. 19, 2008, 2 pages, Japan.

* cited by examiner

*Primary Examiner* — Jewel V Thompson
(74) *Attorney, Agent, or Firm* — Alleman Hall McCoy Russell & Tuttle LLP

(57) ABSTRACT

A testing method for testing a flow controller with high accuracy by shortening as much as possible the time required for the test including the wait time. A testing-subject flow controller and a testing-standard flow controller are arranged in that order in series from the upstream side in a flow channel through which a fluid whose flow is to be controlled flows. In a flow-uncontrolled state in which the valve of the testing-subject flow controller is practically in the full-open state, and with the fluid flow controlled to a predetermined flow rate by the testing-standard flow controller, whether the actual flow-rate measurement according to the testing-subject flow controller falls within a predetermined range of actual flow-rate measurements according to the testing-standard flow controller is determined.

10 Claims, 7 Drawing Sheets

FLOW CONTROLLER, FLOW MEASURING DEVICE TESTING METHOD, FLOW CONTROLLER TESTING SYSTEM, AND SEMICONDUCTOR MANUFACTURING APPARATUS

FIELD OF THE ART

This invention relates to methods of testing flow controllers that in semiconductor-manufacturing and similar processes control the flow of fluids including gases and liquids.

BACKGROUND ART

In semiconductor-wafer and like manufacturing, conventionally flow controllers that control the flow rate of gas supplied to the chamber are employed. Since problems in the accuracy with which the flow controllers control flow rate give rise to product defects in the semiconductor wafers, flow rate tests are carried out at regular or irregular intervals in order to verify whether or not the flow controller is able to control the flow rate as designed.

Specifically, the test is conducted as follows.

In a case where, for example, a flow rate test is conducted on a thermal mass flow controller (hereinafter termed a "thermal MFC 101") comprising a sensor section 101a and a control valve 101b, as shown in FIG. 11, a pressure differential mass flow meter (hereinafter termed a "pressure differential MFM 102") as a testing standard is provided on the downstream side of the thermal MFC 101 under test, and on the upstream side thereof a regulator is provided, each in series. In this case, the pressure differential MFM 102 is realized by actuating a function of the mass flow meter itself, without operating a valve 103V in a pressure differential mass flow controller 103 therein.

Then the flow in a flow channel in between the control valve 101b and the pressure differential MFM 102 is controlled to be a constant flow rate by the control valve 101b of the thermal MFC 101 under test, and after the pressure differential MFM 102 reaches a target pressure at which its operation is stabilized, the test is conducted by comparing an output value from a sensor section in the thermal MFC 101 under test with an output value from the testing-standard pressure differential MFM 102.

It should be noted that the conventional technology just described is implemented to suit conditions at test sites; its disclosure as patent or other literature is not to be found.

DISCLOSURE OF THE INVENTION

Problems to be Solved by the Invention

However, with the conventional configuration, because the thermal MFC 101 controls the flow channel (a dead volume) from the thermal MFC 101 to the pressure differential MFM 102 at a constant flow rate, the pressure rise in the pressure differential MFM 102 is at a constant slope, as indicated in FIG. 12, wherein time is required for it to reach the target pressure. As a consequence, a long wait time takes place till the test starts, let alone the inconvenience of the test period itself being protracted.

The occurrence of a wait time like this arises both in ROR (rate-of-rise) regimes using pressure, temperature, volume and time, as well as in diagnostic regimes (gas law check of integrated flow equation ("G-LIFE") regimes) based on the mass flow summation from a laminar-flow resistive circuit element and on the vapor-state equation.

A main object of the present invention, brought about giving attention to these sorts of issues, is in shortening as much as possible the time required for the test, including the wait time, and in providing a flow-controller testing method whereby the test can be conducted with high accuracy.

Means to Solve the Problems

Namely, a flow controller testing method involving the present invention is a method for testing a flow controller comprising a valve, a flow measuring section for measuring the flow rate of a fluid passing the valve, and a valve control mechanism for controlling the valve so as to make the actual flow-rate measurement determined in the flow measuring section be an assigned target flow rate, and is characterized in: providing in series, in a flow channel through which flows fluid whose flow is to be controlled, a testing-subject flow controller and a testing-standard flow controller, in that order from the upstream side; putting the testing-subject flow controller in a flow-uncontrolled state in which the valve is practically in the full-open state; and with the fluid flow controlled to a predetermined flow rate by the testing-standard flow controller, judging whether or not the actual flow-rate measurement according to the testing-subject flow controller falls within a predetermined range of actual flow-rate measurements according to the testing-standard flow controller.

In accordance with this arrangement, since the testing-subject flow controller is set in a flow rate uncontrolled state with the valve substantially full open, it is possible to raise the pressure of the flow channel (the dead volume) from the testing-subject flow controller to the testing-standard flow controller at once and it is possible to instantly make a pressure of the testing-standard flow controller at a target pressure at which an operation of the testing-standard flow controller is stabilized. As a result, it becomes possible to shorten a time required for the test including a wait time as much as possible and to conduct a test with high accuracy.

In order make it possible to conduct a more accurate judgment, it is preferable that the testing-standard flow controller controls the flow rate of the fluid at multiple values, and it is judged whether or not the actual flow-rate measurement determined by the testing-subject flow controller falls within the predetermined range of the actual flow-rate measurement determined by the testing-standard flow controller at each value respectively.

If a pressure controller to control a pressure of the flow channel at a constant value is arranged on the upstream side of the testing-subject flow controller or between the testing-standard flow controller and the testing-subject flow controller, it is possible to stabilize the operation of the testing-subject flow controller so that the test can be conducted smoothly.

A preferable embodiment of this invention as represented is that a protocol to measure a flow rate used for the testing-standard flow controller is different from that of the testing-subject flow controller. The pressure differential type flow controller is superior in stability to the thermal type flow controller and the pressure differential type can produce its function sufficiently if the downstream side is set at the negative pressure (in a vacuum). Meanwhile, the thermal type flow controller is superior in cost and operational condition to the pressure differential type flow controller. As a result, for example, if the testing-subject flow controller is a thermal type and the testing-standard flow controller is a pressure differential type, it becomes possible to structure a gas system at low cost and with high performance by combining the thermal type flow controller and the pressure differential type flow controller and making use of merits of both of them.

If the valve is arranged on the upstream side of the flow measuring section of the testing-standard flow controller, it is possible to limit a range of the pressure change by arranging the valve on the upstream side and the flow measuring section in the chamber side (in the vacuum side) so that a test can be conducted more accurately. On the other hand, in case that the valve is arranged on the downstream side, the range of the pressure change becomes wide so that it becomes difficult to make a correction with high accuracy.

If the testing-standard flow controller comprises a non-linear resistive element arranged in the flow channel and a pressure sensor that measures a pressure differential of the non-linear resistive element, and the testing-standard flow controller is of a pressure differential type that measures the flow rate based on the pressure measured by the pressure sensor, and the non-linear resistive element is, for example, a laminar flow element having a property that the smaller a pressure differential between both ends of the non-linear resistive element is, the smaller a pressure differential derivative value of the flow rate flowing in the non-linear resistive element is, it is possible to conduct a test with high accuracy in a small flow rate area. It is preferable that the pressure sensor measures an absolute pressure at both ends locating in the upstream side and the downstream side of the non-linear resistive element, and obtains the pressure differential from both of the absolute pressures. In case that the downstream side is at a fixed pressure such as in a vacuum, the pressure sensor may be arranged in the upstream side alone. Contrarily, in case that the upstream side is at a fixed pressure such as in a vacuum, the pressure sensor may be arranged in the downstream side alone.

Meanwhile, in case of the non-linear resistive element having this property, since an error becomes big in the large flow rate area, it is preferable to conduct a test in the large flow rate area by the use of a linear resistive element such as an orifice whose effective flow rate volume is bigger than that of the non-linear resistive element and a relationship between the flow rate flowing inside and the pressure differential between both ends of the non-linear resistive element is linear.

However, a property of the linear resistive element such as an orifice used as a reference in case of a test in the large flow rate area changes due to a change of a kind of the fluid or a change over time because of an influence from a corrosive gas. As a result, if the test is conducted, for example, in a broad range of the flow rate just by combining the small flow rate area and the large flow rate area, it is required to conduct a correction on the linear resistive element every time when the test is conducted, resulting in troublesome procedures.

Then in order to make it possible to conduct a test in a wide ranged without the troublesome procedures in a short period of time, the correction of the linear resistive element (or the flow rate property is figured out) may be conducted at the same time when the test is conducted in the small flow rate area.

More specifically, a linear resistive element is arranged on the downstream side of the testing-standard flow controller, a flow rate property of the linear resistive element is calculated from a corresponding relationship between each pressure differential and the actual flow-rate measurement determined by the testing-standard flow controller by also measuring the pressure differential between both ends of the linear resistive element in case of conducting a judgment at the above-mentioned each value.

In an area exceeding a specified flow rate of the testing-standard flow controller, namely in the large flow rate area it is judged whether or not the actual flow-rate measurement determined by the testing-subject flow controller falls within a predetermined range of a calculated flow rate calculated from the flow rate property of the linear resistive element.

A preferable embodiment of a flow controller testing system as represented is a system for testing a flow controller comprising a valve, a flow measuring section to measure a flow rate of a fluid passing the valve and a valve control mechanism to control the valve so as to make an actual flow-rate measurement determined in the flow measuring section at an assigned target flow rate, wherein comprising a flow channel where the fluid as being an object to be controlled flows, a testing-subject flow controller arranged in the flow channel, a testing-standard flow controller arranged in series in the flow channel on the downstream side of the testing-subject flow controller, and in a flow rate uncontrolled state that the valve of the testing-subject flow controller is substantially fully open and in a state that a flow rate of the fluid is controlled at a predetermined flow rate by the testing-standard flow controller, an information processing unit that receives a flow rate measurement signal output from the testing-subject flow controller and a flow rate measurement signal output from the testing-standard flow controller and determinably outputs whether or not the actual measurement flow rate indicated by the flow rate measurement signal of the testing-subject flow controller falls within a predetermined range of the actual measurement flow rate indicated by the flow rate measurement signal of the testing-standard flow controller.

A preferable embodiment of a semiconductor manufacturing apparatus in accordance with this invention as represented is a semiconductor manufacturing apparatus that can test a flow controller comprising a valve, a flow measuring section to measure a flow rate of a fluid passing the valve and a valve control mechanism to control the valve so as to make an actual flow-rate measurement determined in the flow measuring section at an assigned target flow rate, wherein comprising a process chamber for manufacturing a semiconductor, a flow channel that supplies the process chamber with a fluid for manufacturing the semiconductor, a testing-subject flow controller arranged in the flow channel, a testing-standard flow controller arranged in series in the flow channel on the downstream side of the testing-subject flow controller in series, and in a flow rate uncontrolled state that the valve of the testing-subject flow controller is substantially fully open and in a state that a flow rate of the fluid is controlled at a predetermined flow rate by the testing-standard flow controller, an information processing unit that receives a flow rate measurement signal output from the testing-subject flow controller and a flow rate measurement signal output from the testing-standard flow controller and determinably outputs whether or not the actual measurement flow rate indicated by the flow rate measurement signal of the testing-subject flow controller falls within a predetermined range of the actual measurement flow rate indicated by the flow rate measurement signal of the testing-standard flow controller.

A preferable embodiment of a flow rate measuring device testing method as represented is a method for testing a flow rate measuring device under test comprising a flow measuring section to measure a flow rate of a fluid by the use of a testing-standard flow controller comprising a valve, a flow measuring section to measure the flow rate of the fluid passing the valve and a valve control mechanism to control the valve so as to make an actual flow-rate measurement determined in the flow measuring section at an assigned target flow rate, wherein the flow rate measuring device under test and the testing-standard flow controller are arranged in this order from the upstream side in series in a flow channel through which the fluid whose flow is to be controlled flows, in a state that the flow rate of the fluid is controlled at a predetermined flow rate by the testing-standard flow controller, it is judged whether or not the actual flow-rate measurement determined by the flow rate measuring device under test falls within a predetermined range of the actual flow-rate measurement determined by the testing-standard flow controller.

Effect of the Invention

In accordance with this invention, since the testing-subject flow controller is set in a flow rate uncontrolled state with its valve substantially full open, it is possible to raise the pressure of the dead volume from the testing-subject flow controller to the testing-standard flow controller at once and it is possible to instantly make a pressure of the testing-standard flow controller at a target pressure at which an operation of the testing-standard flow controller is stabilized. As a result, it becomes possible to shorten the time required for the test, including wait time, as much as possible, and to conduct the test with high accuracy.

BEST MODES OF EMBODYING THE INVENTION

A system for testing a flow controller A in accordance with various embodiments of this invention will be explained with reference to drawings.

First Embodiment

Figure 1:
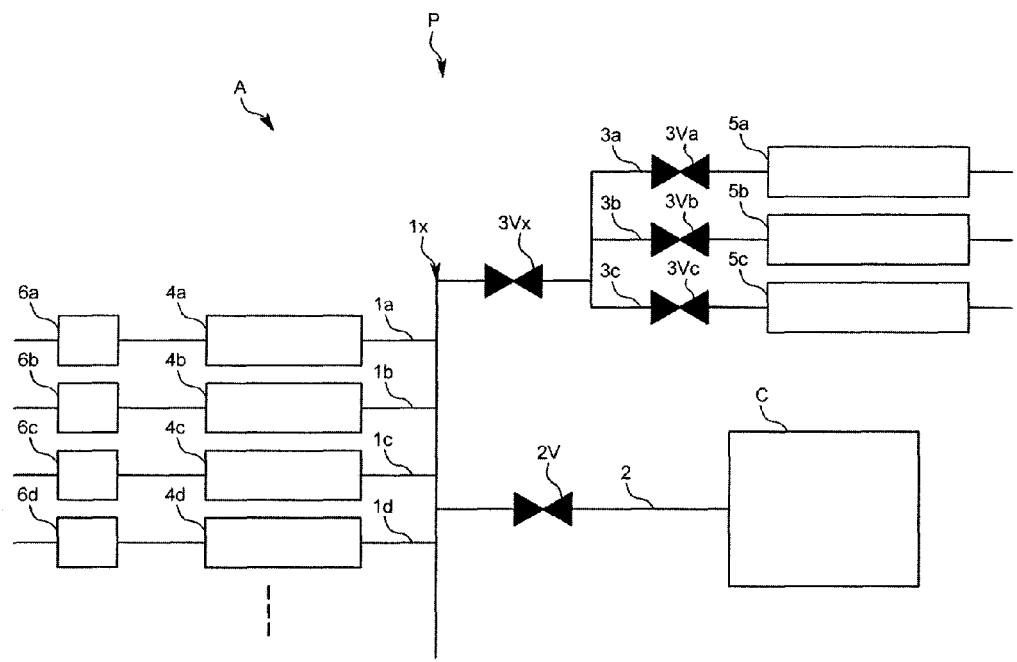
FIG. 1 is a pattern diagram showing a semiconductor manufacturing apparatus comprising a testing system in accordance with one embodiment of this invention.

The system for testing a flow controller A of this embodiment is, as shown in FIG. 1, a part of a semiconductor manufacturing apparatus P and used for testing a flow controller to control various gases supplied to a process chamber C for the semiconductor. Specifically, this testing system A comprises gas supply lines 1, 1*b*, . . . (hereinafter collectively referred to as "a gas supply line 1") where various kinds of gas for manufacturing semiconductor such as a process gas or an etching gas flows, a line for a chamber 2, and lines for test 3*a*, 3*b*, 3*c* (hereinafter collectively referred to as "a line for test 3") arranged in parallel on a downstream side of a converging section where the gas supply lines 1 converge, a flow controller as being an object to be tested 4*a*, 4*b*, . . . (hereinafter collectively referred to as "a testing-subject flow controller 4") each of which is arranged on the gas supply line 1 respectively, a flow controller as being a reference 5*a*, 5*b*, 5*c* (hereinafter collectively referred to as "a testing-standard flow controller 5") each of which is arranged on the line for test 3 respectively, a pressure controller 6*a*, 6*b* . . . (hereinafter collectively referred to as "a pressure controller 6") arranged on the gas supply line 1 on the upstream side of the testing-subject flow controller 4, and an information processing unit 7 that operates the testing-subject flow controller 4 and the testing-standard flow controller 5 to make a predetermined movement and determines whether or not an actual measurement flow rate by the testing-subject flow controller 4 falls within a predetermined range of the actual measurement flow rate by the testing-standard flow controller 5.

Each section will be described.

The gas supply line 1 is so arranged to supply a single gas or a mixed gas to the process chamber C with each upstream side connected to a gas cylinder, not shown in drawings, that accommodates the various kinds of the gas and with each downstream side connected to the converging section 1*x*.

The line for chamber 2 is a line for supplying the various kinds of the gas flowing from the gas supply line 1 to the process chamber C. A valve 2V is arranged to stop the gas flowing into the line for chamber 2 at a time of testing. The valve 2V is open/close-controlled by the information processing unit 7.

Multiple (three in this embodiment) lines for test 3 are arranged in parallel on the downstream side of the converging section 1*x*. The testing-standard flow controller 5, having a different flow rate range that can be tested, namely, whose flow control range differs respectively is arranged for each line for test 3. Specifically, the testing-standard flow controller 5*a* that can measure (control) the flow rate of 20~200 sccm is arranged on the line for test 3*a*, the testing-standard flow controller 5*b* that can measure (control) the flow rate of 200~2,000 sccm is arranged on the line for test 3*b*, and the testing-standard flow controller 5*c* that can measure (control) the flow rate of 2,000~20,000 sccm is arranged on the line for test 3*c*. And the valves 3V*a*, 3V*b*, 3V*c* are arranged on the upstream side of the testing-standard flow controller 5. Furthermore, a valve 3V*x* is arranged on the line for test 3 in order to stop the various kinds of the gas flowing into the line for test 3 at a time when the test is not conducted. These valves 3V*a*~3V*c* and the valve 3V*x* are open/close-controlled by the information processing unit 7.

Figure 2:
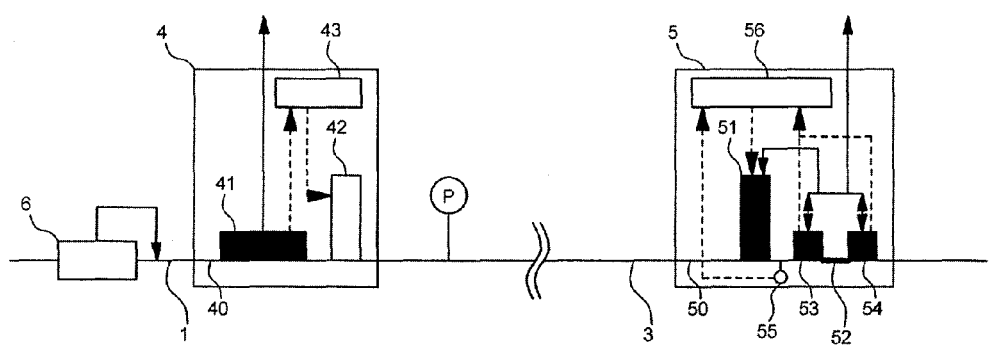
FIG. 2 is a configuration diagram of the testing system in this embodiment.

In this embodiment, the testing-subject flow controller 4 is a thermal type mass flow controller. The testing-subject flow controller 4 is driven by a command signal from outside. In case that a set flow rate is given by the command signal, the testing-subject flow controller 4 controls the valve so that the flow rate can be the set flow rate by performing a local feedback control, and the testing-subject flow controller 4 also controls the valve in a fully open condition or a fully closed condition by performing an open loop control depending on a content of the command signal. As an internal configuration, the testing-subject flow controller 4 comprises, as shown in FIG. 2, an internal flow channel 40, a flow rate sensor section 41 that measures a flow rate of a fluid flowing in the internal flow channel 40, a flow control valve 42 arranged on, for example, the downstream side of the flow rate sensor section 41, and a flow control processing unit 43. Each section will be explained in more detail.

The internal flow channel 40, although its detail is not shown in drawings, comprises an inlet port and an outlet port, each of which is connected to the gas supply line 1, a hollow narrow tube that bifurcates between the inlet port and the outlet port and then converges, and a bypass section.

The flow rate sensor section 41, although its detail is not shown in drawings, comprises, for example, a pair of thermal sensors arranged in the hollow narrow tube. An instant flow rate of the fluid is detected by the thermal sensor as an electric signal, and the electric signal is amplified by the internal electric circuit and then output as a flow rate measurement signal having a value based on the detected flow rate.

The flow control valve 42, although its detail is not shown in drawings, is so arranged to change its valve open degree by means of, for example, an actuator comprising piezoelectric elements. The actuator is driven by an open degree control signal from the flow control processing unit 43 and the valve open degree is adjusted to a degree based on a value of the valve open degree signal.

The flow control processing unit 43 comprises a digital or analog electric circuit having a CPU, an internal memory, an A/D convertor and a D/A convertor, a communication interface to communicate with the flow control valve 42 and an input interface. Then the flow control processing unit 43 receives the command signal from outside such as an information processing unit 7 and interprets a content of the command signal, in case that the command signal shows the set flow rate, and then conducts a local feedback control so as to be the set flow rate. Specifically, the flow control processing unit 43 produces an open degree control signal that controls the valve open degree of the flow control valve 42 from a deviation and outputs the valve open degree signal to the flow control valve 42.

The testing-standard flow controller 5 is a pressure differential type mass flow controller, and comprises, as shown in FIG. 2, an internal flow channel 50 inside of which a gas flows, a flow control valve 51 arranged in the internal flow channel 50, a resistive element 52 for generating a pressure differential, pressure sensors 53, 54 each of which measures each end of the resistive element 52 respectively, a temperature sensor 55 that detects a temperature at the inlet side of the gas flowing in the internal flow channel 50 and a flow rate control processing unit 56.

The internal flow channel 50 opens its upstream end as the inlet port and its downstream end as the outlet port. An air pressure valve, a pressure regulator and a gas cylinder (not shown in drawings) are connected to the inlet port through an outside pipe.

The flow control valve 51, although its detail is not shown in drawings, is so arranged to change its valve open degree by means of, for example, an actuator comprising piezoelectric elements, and drives the actuator at a time when an open degree control signal is given from the flow rate control processing means 56 and controls the flow rate of the gas by adjusting the flow control valve 51 at the valve open degree based on a value of the valve open degree signal.

Figure 3:
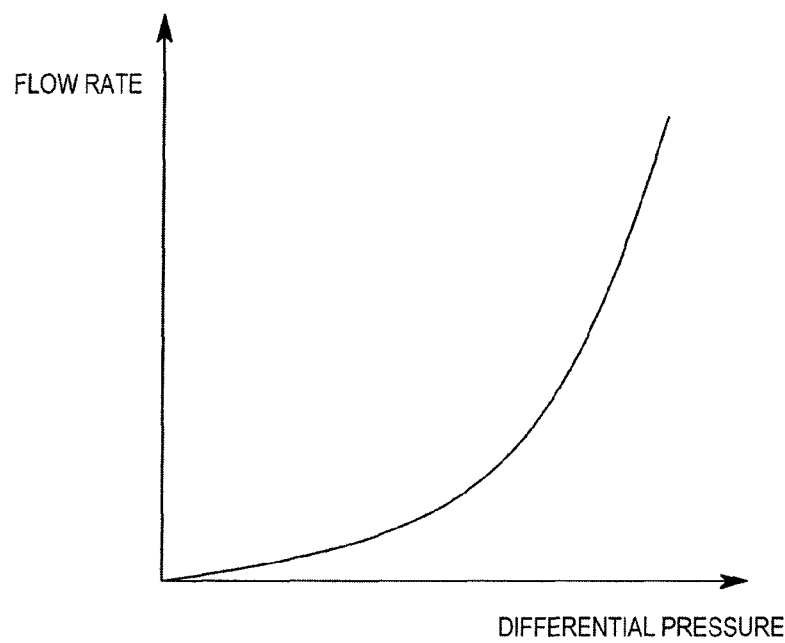
FIG. 3 is a flow rate property diagram showing a relationship between a flow rate and a pressure differential of a non-linear resistive element in this embodiment.

The resistive element 52 comprises an inlet to which the gas flowing from the flow rate control valve 51 is introduced and an outlet from which the gas is discharged. The resistive element 52 generates a pressure differential between the inlet and the outlet. In this embodiment, as the resistive element 52 used is, for example, as shown in FIG. 3, a non-linear resistive element such as a laminar flow element having a property that the smaller the pressure differential is, the smaller a pressure differential derivative value of the flow rate flowing in the resistive element 52 is.

There are the inlet side sensor 53 and the outlet side sensor 54 as the pressure sensors. The inlet side sensor 53 detects a pressure of the gas flowing in a primary side of the resistive element 52, namely at the inlet side of the internal flow channel 50. The outlet side sensor 54 detects a pressure of the gas flowing in a secondary side of the resistive element 52, namely at the outlet side of the internal flow channel 50. In this embodiment, an absolute pressure type pressure sensor is used for the pressure sensors 53, 54.

The flow rate control processing unit 56 comprises a digital or analog electric circuit having a CPU, an internal memory, an A/D converter and a D/A converter, not shown in drawings, a communication interface to communicate with the flow rate control valve 51, and an input interface. By operating the CPU or its peripheral devices based on a program stored in the internal memory, the flow rate control processing unit 56 produces at least functions as a flow rate calculating section (not shown in drawings) that calculates a mass flow rate of the gas based on the pressure value detected by each sensor 53 and 54, a deviation calculating section (not shown in drawings) that calculates a deviation between the mass flow rate of the gas obtained in the flow rate calculating section and the flow rate set value, a control value calculating section (not shown in drawings) that calculates a feedback control value that feedback-controls the flow rate control valve 51 by providing at least a proportion operation (in addition, the operation may be an integration operation and a differentiation operation) on the deviation obtained in the deviation calculating section, and a valve control signal output section (not shown in drawings) that produces an open degree control signal having a value based on the feedback control value obtained in the control value calculating section and outputs the open degree control signal to the flow rate control valve 51.

The pressure control unit 6 comprises, for example, a regulator. The pressure control unit 6 feedback-controls a pressure at a downstream side of the pressure control unit 6 so that the pressure becomes a target pressure. A value of the target pressure can be set by a command signal from the information processing unit 7.

The information processing unit 7 comprises a digital or analog electric circuit having a CPU, an internal memory, an A/D convertor and a D/A convertor (not shown in drawings), a communication interface to communicate with each section of the testing-subject flow controller 4 and the testing-standard flow controller 5, an input interface and a display device such as a liquid crystal display. The information processing unit 7 may be dedicated or a part or all of the information processing unit 7 may utilize a multipurpose computer such as a personal computer. In addition, an analog circuit alone may serve the following function without using a CPU. The information processing unit 7 is not necessarily physically integrated such that it utilizes a control unit (omit to be shown in drawings) for a semiconductor manufacturing apparatus P or flow rate control processing unit of each flow controller 4, 5 as a part of the function thereof. In addition, the information processing unit 7 may comprise multiple instruments mutually connected each other by wire or without wires.

Figure 4:
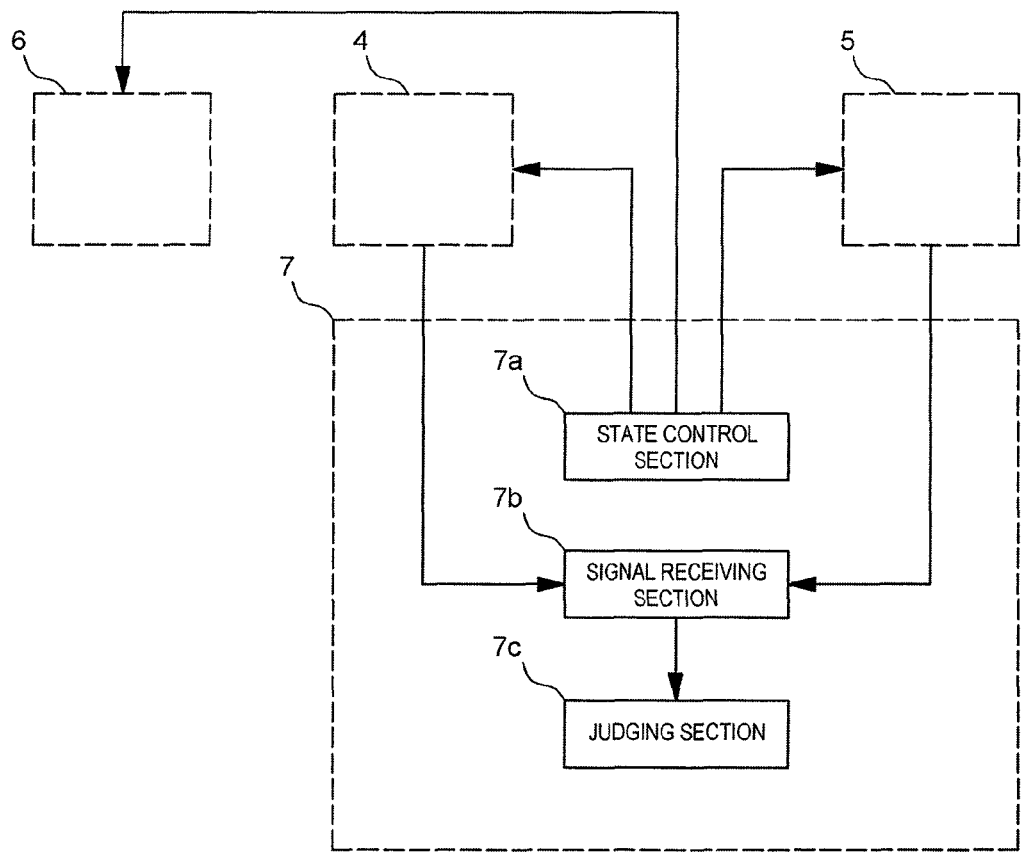
FIG. 4 is a configuration diagram of an information processing unit of the testing system in this embodiment.

Then a predetermined program is stored in the internal memory and the CPU and its peripheral devices are operated based on the program so that the information processing unit 7 produces functions, as shown in FIG. 4, at least as a state control section 7a, a signal receiving section 7b, and a judging section 7c. Each section will be described.

The state control section 7a outputs a command signal for test by making use of a test start command as a trigger by operating the input interface and operates the testing-subject flow controller 4, the testing-standard flow controller 5 and the pressure controller 6 based on the command signal respectively. Concrete test operation will be described later.

The signal receiving section 7b receives a flow rate measurement signal for test from a flow rate sensor section 41 of the testing-subject flow controller 4 and receives a flow rate measurement signal for reference from a flow rate calculating section of the testing-standard flow controller 5.

The judging section 7c compares the flow rate measurement signal for test with the flow rate measurement signal for reference, each of which is received in the signal receiving section 7b, judges whether or not the actual measurement flow rate indicated by the flow rate measurement signal for test falls within a predetermined range of the actual measurement flow rate indicated by the flow rate measurement signal for reference and outputs the judged result. An output form of the judged result may be set arbitrarily such as on a display or printed in accordance with the embodiment.

Figure 5:
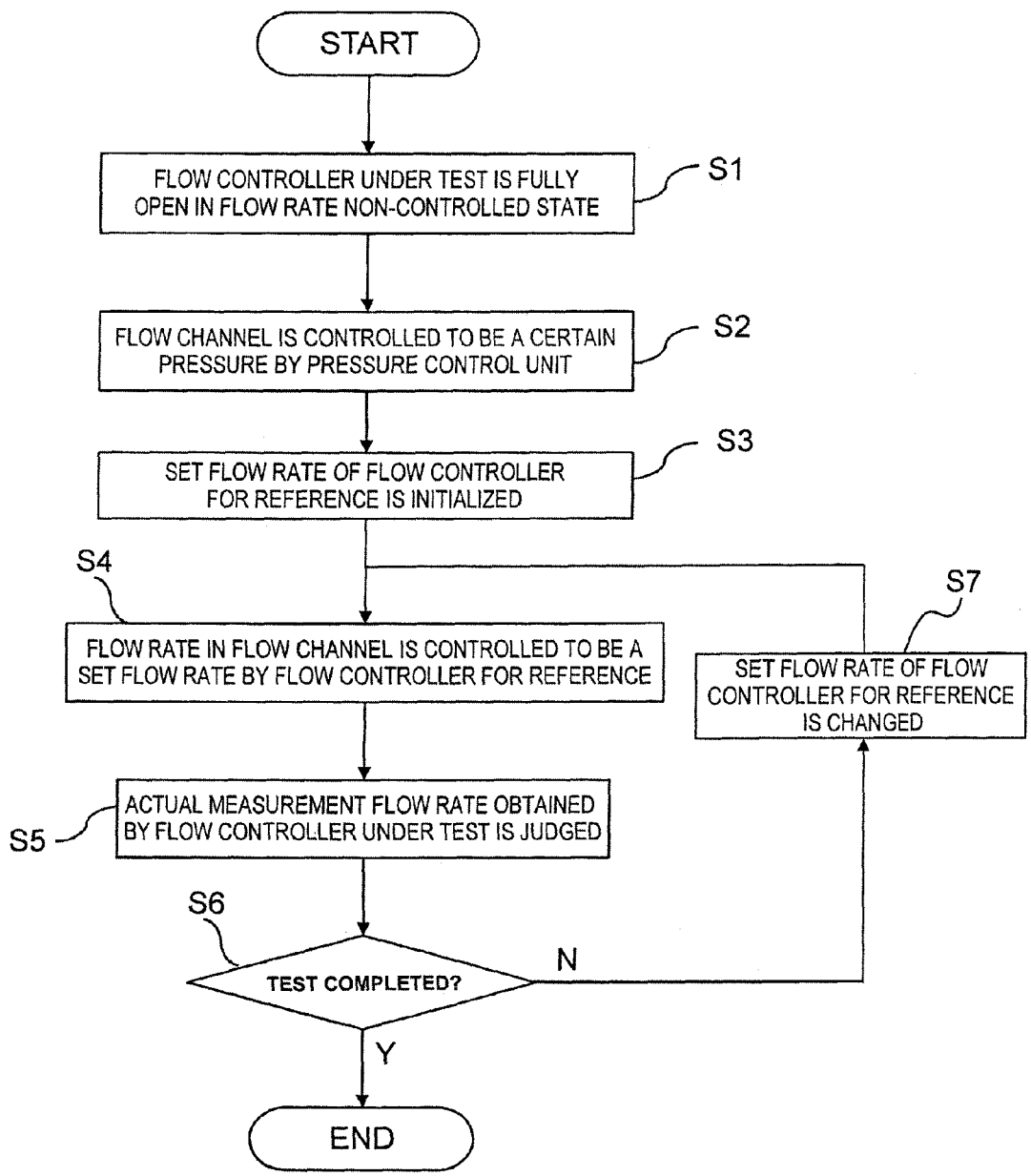
FIG. 5 is a flow chart to explain an operation in accordance with a testing of the information processing unit in this embodiment.

Next, a procedure of testing by the use of the system for testing the flow controller having the above arrangement A will be explained with reference to FIG. 5.

First, a test is started by operating the input interface of the information processing unit 7. Then the test start command is transmitted to the state control section 7a of the information processing unit 7.

The state control section 7a outputs a command signal by making use of the test start command as a trigger and makes the valve 42 of the testing-subject flow controller 4 fully open so as to be in a flow rate uncontrolled state (step S1). More specifically, the testing-subject flow controller 4 works as a mass flow meter alone in this flow rate uncontrolled state.

Meanwhile, the state control section 7a outputs a command signal also to the pressure controller 6 and conducts a local feedback control on the pressure controller 6 so as to make a pressure in a flow channel 3 on a downstream side of the pressure controller 6 at a certain target pressure contained in the command signal (step S2).

Then, the state control section 7a outputs a command signal containing a flow rate set value to the testing-standard flow controller 5 and conducts a local feedback control on the testing-standard flow controller 5 so that the testing-standard flow controller 5 is in the flow rate controlled state (a state that the flow rate control processing means 56 conducts a PID control based on the deviation between the flow rate set value indicated by the command signal and the actual measurement flow rate value) (step S4).

Next, the signal receiving section 7b receives a flow rate measurement signal for test from the flow rate sensor section 41 of the testing-subject flow controller 4 and receives a flow rate measurement signal for reference from the flow rate calculating section of the testing-standard flow controller 5, and the judging section 7c compares the received flow rate measurement signal for test with the flow rate measurement signal for reference. Then the judging section 7c judges whether or not the actual measurement flow rate indicated by the flow rate measurement signal for test falls within a predetermined range of the actual measurement flow rate indicated by the flow rate measurement signal for reference, and outputs the judged result (step S5).

In this embodiment, the flow rate controller for reference 5 controls the flow rate of the fluid at multiple values and the judging section 7c judges whether or not the actual measurement flow rate of the testing-subject flow controller 4 falls within a predetermined range of the actual measurement flow rate of the testing-standard flow controller 5 at the above-mentioned each value respectively (step S3, S5, S7). For example, in case of testing a flow rate of 100 sccm or 50 sccm on the testing-subject flow controller 4a, the judgment is conducted by operating the testing-standard flow controller 5a that can measure (control) a flow rate of 20~200 sccm in a performance rate of 50% or 25%. In addition, in case of testing a flow rate of 1000 sccm on the testing-subject flow controller 4a, the judgment is conducted by operating the testing-standard flow controller 5b that can measure (control) a flow rate of 200~2000 sccm in a performance rate of 50%. As mentioned, since multiple flow controllers for reference 5 whose flow control range differs each other can be arbitrarily selected for a single testing-subject flow controller 4 in conducting a test on a flow rate and each actual measurement flow rate can be compared at multiple values, a judged result of the test on the flow rate can be obtained accurately in a broader range of the flow rate.

Figure 6:
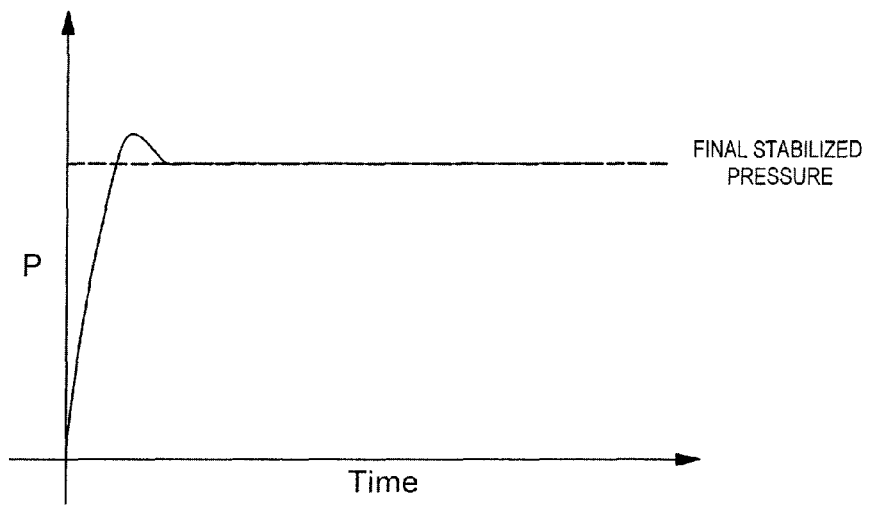
FIG. 6 is a view to explain a pressure state at a time of operating the testing system in accordance with this embodiment.

In accordance with the system for testing the flow controller A having the above arrangement, since the test is conducted with the testing-subject flow controller 4 set in a flow rate uncontrolled state and the fluid flow rate controlled at the predetermined flow rate by the testing-standard flow controller 5, it is possible to raise the pressure of the flow channel (dead volume) from the testing-subject flow controller 4 to the testing-standard flow controller 5 at once, as shown in FIG. 6, and to make the testing-standard flow controller 5 quickly at a target pressure at which an operation of the testing-standard flow controller 5 is stabilized. As a result, it becomes possible to shorten a time required for the test including a wait time as much as possible and to conduct a test with high accuracy. In addition, since the pressure between the testing-subject flow controller 4 and the testing-standard flow controller 5 is controlled at a constant value by the pressure controller 6, it is possible to stabilize the operation of the testing-subject flow controller 4 so that the test can be conducted smoothly.

In addition, the testing-standard flow controller 5 controls the flow rate of the fluid at multiple values and it is judged whether or not the actual measurement flow rate of the testing-subject flow controller 4 falls within the predetermined range of the actual measurement flow rate of the testing-standard flow controller 5 at the above-mentioned each value respectively. As a result, since it is possible to know a linearity of the flow rate and the zero point, the judgment can be conducted more accurately.

Furthermore, since the testing-subject flow controller 4 is the thermal type and the testing-standard flow controller 5 is the pressure differential type, it is possible to structure the gas system with high performance and at low cost.

In addition, since the testing-standard flow controller 5 has a structure that the flow rate control valve 51 is arranged on the upstream side of the pressure sensors 53, 54 and the pressure sensors 53, 54 are arranged at a chamber side (vacuum side), it is possible to limit a range of a pressure change, thereby enabling to conduct the test further more accurately.

Furthermore, since the lines for test 3 are arranged in multiple and the testing-standard flow controller 5 whose range of a flow rate wherein the test can be conducted differs each other (having a different flow rate control range) is arranged for each line for test 3, it is possible to conduct the test in a range that a user wants with high accuracy.

Second Embodiment

Next, a second embodiment of this invention will be explained. The same components as those in the first embodiment are denoted by the same reference codes as those in this embodiment.

Figure 7:
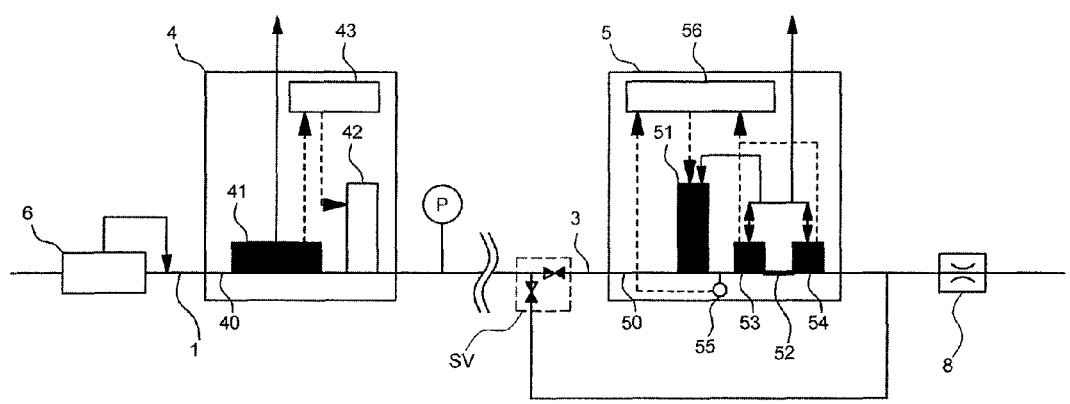
FIG. 7 is a configuration diagram of a testing system in accordance with a second embodiment of this invention.
Figure 8:
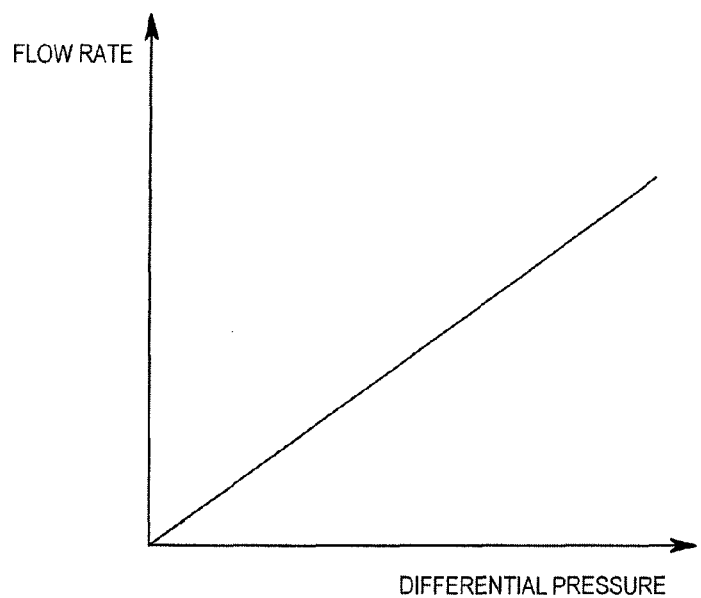
FIG. 8 is a flow rate property diagram showing a relationship between a flow rate and a pressure differential of a linear resistive element in this embodiment.

In this second embodiment, as shown in FIG. 7, only a single testing-standard flow controller 5 is used and a linear resistive element (an orifice) 8 is arranged on the downstream side of the testing-standard flow controller 5. As shown in FIG. 8, a relationship between a flow rate flowing inside the linear resistive element 8 and a pressure differential between both ends of the linear resistive element 8 is linear and an effective flow rate volume of the linear resistive element 8 is bigger than that of the non-linear resistive element 52. A reference code BL in FIG. 7 is a bypass line to introduce a fluid into the linear resistive element 8 without using the testing-standard flow controller at a time of conducting a test by the use of the linear resistive element 8.

Figure 9:
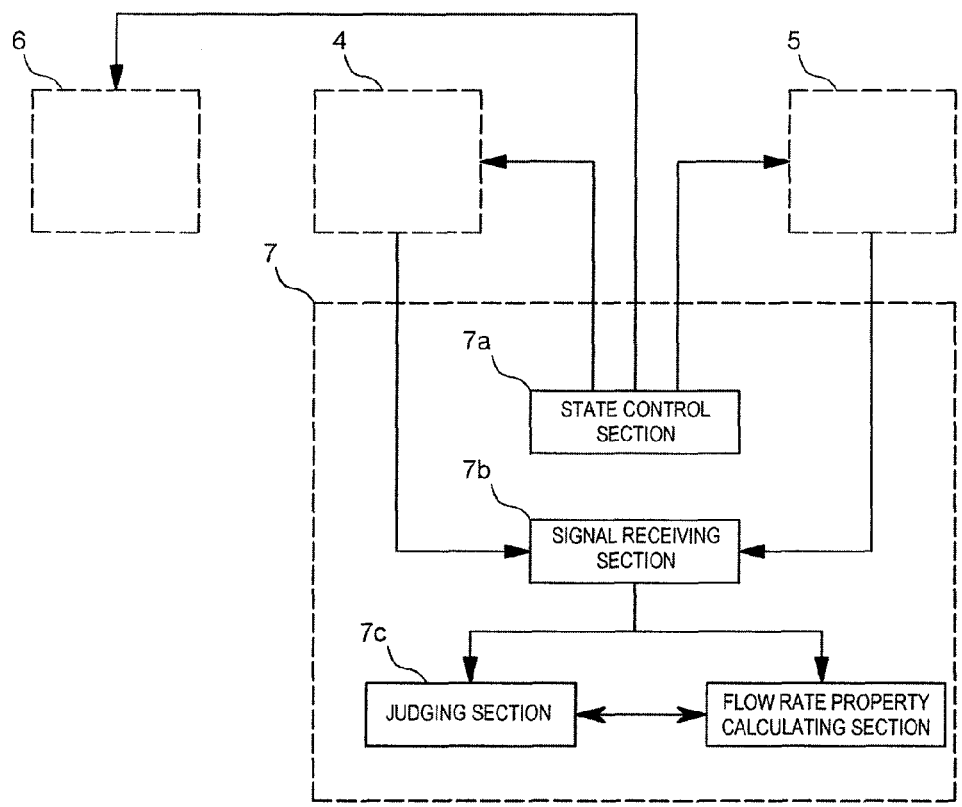
FIG. 9 is a configuration diagram of an information processing unit of the testing system in this embodiment.

In addition, an information processing unit 7 comprises functions as, as shown in FIG. 9, a state controlling section 7a, a signal receiving section 7b, a judging section 7c and a flow rate property calculating section 7d.

Next, a performance of the information processing unit 7 in case of conducting a test in this second embodiment will be explained.

First, in a specified flow rate of the testing-standard flow controller 5, more specifically, in a small flow rate area wherein a flow rate can be controlled with a sufficient accuracy for conducting the test, similar to the first embodiment, the information processing unit 7 compares a flow rate measurement signal for test with a flow rate measurement signal for reference at each different value of the flow rate, and judges whether or not the actual measurement flow rate indicated by the flow rate measurement signal for test falls within a predetermined area of the actual measurement flow rate indicated by the flow rate measurement signal for reference.

At the same time as judging at the above-mentioned each value by the judging section 7c of the information processing unit 7, the flow rate property calculating section 7d also measures a pressure differential between both ends of the linear resistive element 8, calculates a flow rate property of the linear resistive element 8 based on a relationship between each pressure differential and the actual measurement flow rate by the testing-standard flow controller 5, and stores it in a memory. Although the flow rate property is obtained in the small flow rate area, it is possible to derive a relationship between the flow rate flowing in the linear resistive element 8 in a large flow rate area and the pressure differential.
In this embodiment, since a pressure at a secondary side of the linear resistive element 8 is zero (namely in a vacuum), only a pressure at a primary side of the linear resistive element 8 is measured in order to obtain a pressure differential between both ends of the linear resistive element 8, and an outlet side sensor 54 of the testing-standard flow controller 5 is used as a sensor to measure the pressure at the primary side. It is a matter of course that a dedicated pressure sensor may be arranged at both ends of the linear resistive element 8.

Next, a switch valve SV is switched so that the fluid can be introduced into the linear resistive element 8 through the bypass line BL.
Then, a test is conducted in an area exceeding the specified flow rate of the testing-standard flow controller 5, in other words in a large flow rate area. More concretely, the judging section 7c judges whether or not the actual measurement flow rate by the testing-subject flow controller 4 falls within a predetermined area of a calculated flow rate calculated from the flow rate property of the linear resistive element 8. Similar to the small flow rate area, the judgment is conducted at multiple different flow rate values.

The bypass line is not necessarily required. In the large flow rate area, the testing-standard flow controller 5 may be in a flow rate uncontrolled state with the valve 51 fully open so that the fluid can be introduced into the linear resistive element 8 through the testing-standard flow controller 5.

A sufficient test accuracy is not secured in the small flow rate area in case that the linear resistive element 8 is used, however, it is possible to conduct a test on a flow rate with high accuracy in the small flow rate area if a non-linear resistive element 52 having the above-mentioned property is used.

Meanwhile, in case of the non-linear resistive element 52 having this property, there might be a problem that an error becomes big in the large flow rate area. However, since the linear resistive element 8 is used in the large flow rate area, it is possible to secure a sufficient accuracy for the test also in the large flow rate area, resulting in enabling an accurate test in a quite wide range of the flow rate.

In addition, since a flow rate property of the linear resistive element 8 used as a reference in case of a test in the large flow rate area changes due to a change of a kind of the fluid or a change over time because of an influence from a corrosive gas, under ordinary circumstances the flow rate property is required to be measured every time when the correction is conducted. However, in this second embodiment, since the flow rate property of the linear resistive element 8 is calculated and figured out at a time of conducting the test in the small flow rate area, it becomes possible to conduct a test in a short period of time without a troublesome process.

The present claimed invention is not limited to the above-mentioned embodiment.

For example the testing-subject flow controller is not limited to the thermal type. In addition, the testing-standard flow controller is not limited to the pressure differential type.

In the above-mentioned embodiment, the pressure controller is arranged on the upstream side of the testing-subject flow controller, however, it may be arranged between the testing-subject flow controller and the testing-standard flow controller.

Figure 10:
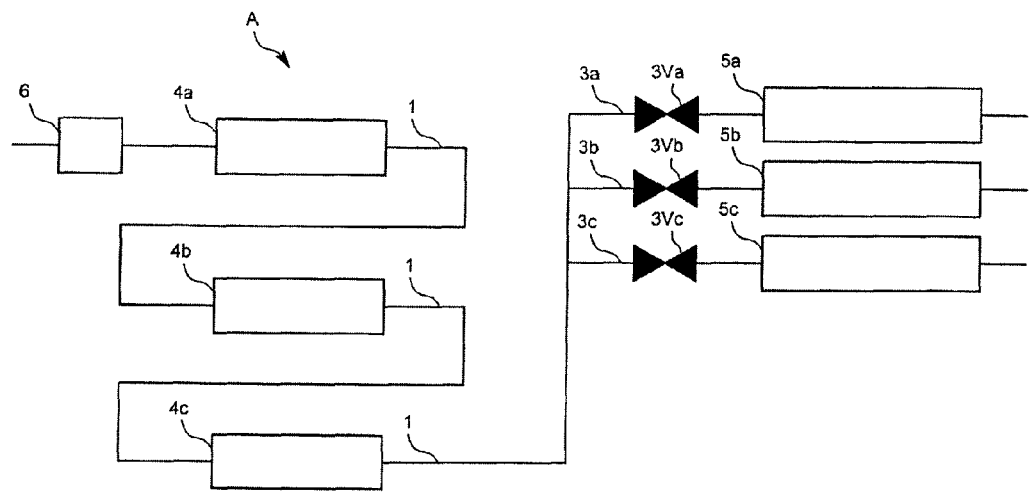
FIG. 10 is a pattern diagram showing a testing system in accordance with another embodiment of this invention.
Figure 11:
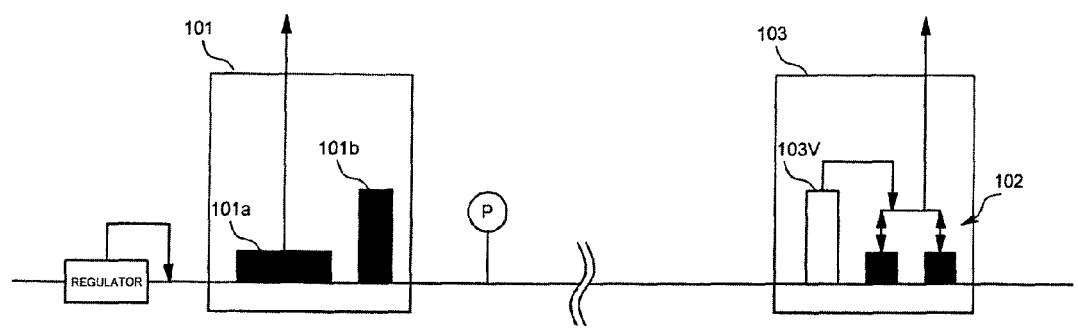
FIG. 11 is a configuration diagram of a conventional testing system.
Figure 12:
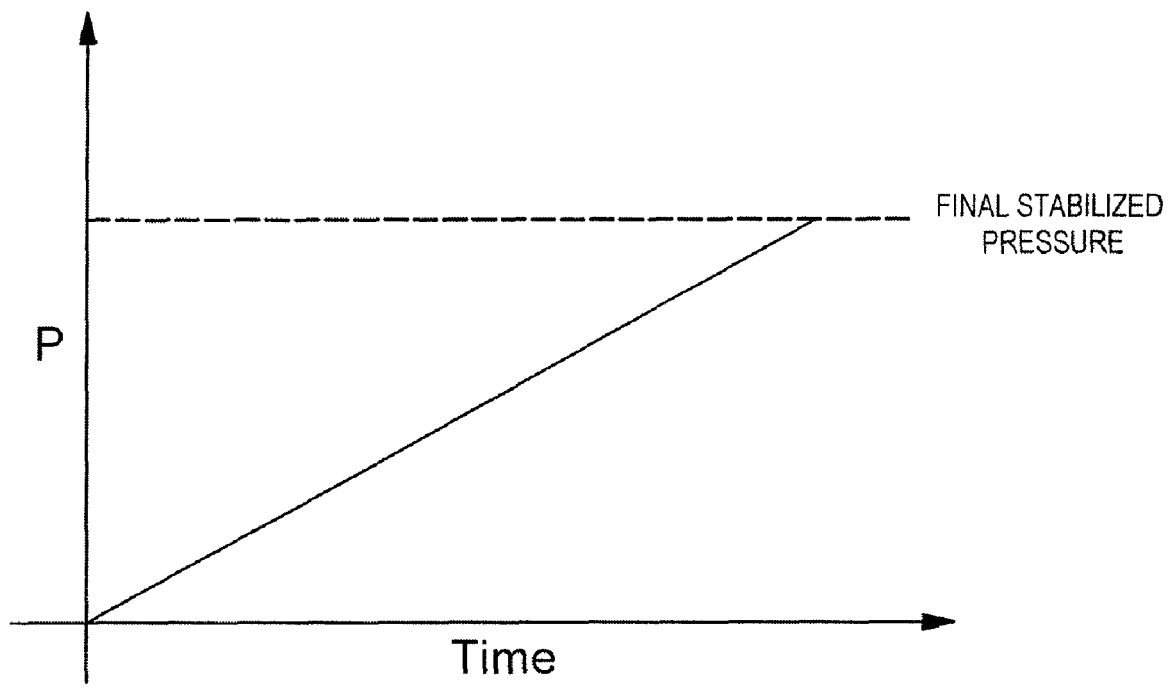
FIG. 12 is a view to explain a pressure state at a time of operating the conventional testing system.

In addition, multiple flow controllers under test may be arranged in series in the gas supplying line. For example, as shown in FIG. 10, the multiple (three in FIG. 5) identical flow controllers under test 4 are arranged in series in the gas supplying line 1 and it is possible to judge whether or not the actual measurement flow rate of each of the flow controllers under test falls within a predetermined range of the actual measurement flow rate indicated by the testing-standard flow controller 5 at once. With this arrangement, it is possible to increase a number of the flow controllers that can be tested per hour so that it becomes useful for the test, for example, at a time of shipping the flow controllers from a factory. At this time, the multiple flow controllers under test 4 arranged in the gas supplying line may not be identical.

In this embodiment, the lines for test are arranged in multiple and a testing-standard flow controller whose range of a flow rate wherein the test can be conducted differs each other, namely, having a different flow rate control range, is arranged in each line for test, however, a single line for test may be arranged.

Furthermore, the object to be tested may be a flow rate measuring device comprising a flow measuring section to measure a flow rate of a fluid. In this case also, if the test is conducted with the same method as that of the above-mentioned testing method by the use of the testing-standard flow controller, it becomes possible to shorten a time required for the test including a wait time as much as possible and to conduct a test with high accuracy.

In addition, a concrete arrangement of each section is not limited to the above-mentioned embodiment and may be variously modified without departing from a spirit of the invention.

POSSIBLE APPLICATIONS IN INDUSTRY

In accordance with this invention, since the testing-subject flow controller is set in a flow rate uncontrolled state with the valve substantially full open, it is possible to raise the pressure of the dead volume from the testing-subject flow controller to the testing-standard flow controller at once and it is possible to instantly make a pressure of the testing-standard flow controller at a target pressure at which an operation of the testing-standard flow controller is stabilized. As a result, it becomes possible to shorten a time required for the test including a wait time as much as possible and to conduct a test with high accuracy.

The invention claimed is:

1. A method for testing a flow controller comprising a valve, a flow measuring section for measuring the flow rate of a fluid passing the valve, and a valve control mechanism for controlling the valve so as to make the actual flow-rate measurement determined in the flow measuring section be an assigned target flow rate, the flow controller testing method comprising:
providing in series, in a flow channel through which flows fluid whose flow is to be controlled, a testing-subject flow controller and a testing-standard flow controller, in that order from the upstream side;
put the testing-subject flow controller in a flow-uncontrolled state in which the valve is practically in the full-open state; and
with the fluid flow controlled to a predetermined flow rate by the testing-standard flow controller, judging whether or not the actual flow-rate measurement according to the testing-subject flow controller falls within a predetermined range of actual flow-rate measurements according to the testing-standard flow controller.

2. The flow-controller testing method set forth in claim 1, comprising:
by means of the testing-standard flow controller, controlling the flow rate of the fluid at multiple points; and
judging at each of the points respectively whether or not the actual flow-rate measurement determined by the testing-subject flow controller falls within the predetermined range of actual flow-rate measurements according to the testing-standard flow controller.

3. The flow-controller testing method set forth in claim 1, further comprising providing either on the further upstream side of the testing-subject flow controller, or between the flow controllers, a pressure controller for controlling the pressure in the flow channel to be constant.

4. The flow-controller testing method set forth in claim 1, further comprising utilizing for the testing-standard flow controller a flow-rate measuring protocol different from that of the testing-subject flow controller.

5. The flow-controller testing method set forth in claim 4, further comprising utilizing a thermal type for the testing-subject flow controller, and utilizing a differential-pressure type for the testing-standard flow controller.

6. The flow-controller testing method set forth in claim 5, further comprising utilizing the testing-standard flow controller, the valve being disposed further upstream than the flow measuring section.

7. The flow-controller testing method set forth in claim 2, further comprising:
equipping the testing-standard flow controller with a non-linear resistive element having the property that the smaller is the pressure differential between either end, the smaller is the derivative of the pressure differential in a flow quantity flowing over the non-linear resistive element, and with a pressure sensor for measuring pressure differential occurring in the non-linear resistive element, with the testing-standard flow controller being a pressure differential type that measures the flow rate based on the pressure differential measured by the pressure sensor;
providing a linear resistive element, in which the relationship between a flow quantity flowing inside the linear resistive element and the pressure differential between either ends thereof is linear, on the downstream side of the testing-standard flow controller;
in the judgment at each said point, also measuring the pressure differential between either end of the linear resistive element, thereby to calculate a flow rate property of the linear resistive element from correspondence relationships between each of the pressure differentials and the actual flow-rate measurements determined by the testing-standard flow controller; and
in an area where the regulation flow rate of the testing-standard flow controller is exceeded, judging whether or not the actual flow-rate measurement determined by the testing-subject flow controller falls within a predetermined range of calculated flow rates calculated from the flow rate property of the linear resistive element.

8. A system for testing a flow controller comprising a valve, a flow measuring section for measuring the flow rate of a fluid passing the valve, and a valve control mechanism for controlling the valve so as to make the actual flow-rate measurement determined in the flow measuring section be an assigned target flow rate, the flow controller testing system comprising:
a flow channel where fluid whose flow is to be controlled flows;
a testing-subject flow controller arranged in the flow channel;
a testing-standard flow controller arranged in series in the flow channel on the downstream side of the testing-subject flow controller; and
an information processing unit for receiving a flow rate measurement signal output from the testing-subject flow controller and a flow rate measurement signal output from the testing-standard flow controller, in a flow-uncontrolled state in which the valve of the testing-subject flow controller is practically in the full-open state, and with the fluid flow controlled to a predetermined flow rate by the testing-standard flow controller, and for determinably outputting whether or not actual measurement flow rate indicated by the flow rate measurement signal of the testing-subject flow controller falls within a predetermined range of actual flow-rate measurements indicated by the flow rate measurement signal of the testing-standard flow controller.

9. A semiconductor manufacturing apparatus for testing a flow controller comprising a valve, a flow measuring section for measuring the flow rate of a fluid passing the valve, and a valve control mechanism for controlling the valve so as to make the actual flow-rate measurement determined in the flow measuring section be an assigned target flow rate, the semiconductor manufacturing apparatus comprising:

a process chamber for semiconductor manufacture;

a flow channel for supplying semiconductor manufacturing fluids to the process chamber;

a testing-subject flow controller, provided in the flow channel;

a testing-standard flow controller, provided in series in the flow channel on the downstream side of the testing-subject flow controller; and an information processing unit for receiving a flow rate measurement signal output from the testing-subject flow controller and a flow rate measurement signal output from the testing-standard flow controller, in a flow-uncontrolled state in which the valve of the testing-subject flow controller is practically in the full-open state, and with the fluid flow controlled to a predetermined flow rate by the testing-standard flow controller, and for determinably outputting whether or not actual measurement flow rate indicated by the flow rate measurement signal of the testing-subject flow controller falls within a predetermined range of actual flow-rate measurements indicated by the flow rate measurement signal of the testing-standard flow controller.

10. A flow-rate testing device testing method of utilizing a testing-standard flow controller comprising a valve, a flow measuring section for measuring the flow rate of a fluid passing the valve, and a valve control mechanism for controlling the valve so as to make the actual flow-rate measurement determined in the flow measuring section be an assigned target flow rate, to test a testing-subject flow rate measuring device furnished with a flow measuring section for measuring fluid flow rates, the flow-rate testing device testing method comprising:

providing in series, in a flow channel through which flows fluid whose flow is to be controlled, testing-subject flow rate measuring device and a testing-standard flow controller, in that order from the upstream side; and with the fluid flow controlled to a predetermined flow rate by the testing-standard flow controller, judging whether or not the actual flow-rate measurement according to the testing-subject flow controller falls within a predetermined range of actual flow-rate measurements according to the testing-standard flow controller.

* * * * *